United States Patent [19]

Titomir et al.

[11] Patent Number: 5,897,813
[45] Date of Patent: Apr. 27, 1999

[54] ELECTRICALLY CONDUCTING PAINT MATERIAL

[75] Inventors: Alexandr Kozmovich Titomir; Jury Mikhailovich Platonov, both of Moscow, Russian Federation

[73] Assignee: Mirson, France

[21] Appl. No.: 09/011,686

[22] PCT Filed: Aug. 21, 1996

[86] PCT No.: PCT/RU96/00240

§ 371 Date: Feb. 13, 1998

§ 102(e) Date: Feb. 13, 1998

[87] PCT Pub. No.: WO97/08256

PCT Pub. Date: Mar. 6, 1997

[30] Foreign Application Priority Data

Aug. 23, 1995 [RU] Russian Federation ............ 95114472

[51] Int. Cl.⁶ ........................................ H01B 1/24
[52] U.S. Cl. ........................................ 252/511
[58] Field of Search ........................ 252/511; 524/495; 423/448

[56] References Cited

U.S. PATENT DOCUMENTS 4,578,286   3/1986   Vasta ........................................ 427/327

FOREIGN PATENT DOCUMENTS 0085413   8/1983   European Pat. Off. .
2662703  12/1991   France .
3420968  12/1985   Germany .
 318608   4/1972   U.S.S.R. .
 681080   8/1979   U.S.S.R. .
1296855  11/1972   United Kingdom .
92-03509  3/1992   WIPO .

*Primary Examiner*—Mark Kopec
*Attorney, Agent, or Firm*—Parkhurst & Wendel, L.L.P.

[57] ABSTRACT

The invention pertains to the production of electrically conducting paint materials based on synthetic polymer binders and can be used in various industries to produce electrically conducting film coatings with stable electrical characteristics across the entire film coating surface on large-area dielectric substrates. The preferred area of use is that of electrical heating devices and systems used for various purposes operating at temperatures of 30–120° C. The electrically conducting paint material contains a synthetic polymer binder, a carbon-containing filler, a solidifier and an organic solvent. The carbon-containing filler is a mixture of graphite and soot, the relative proportion of soot to graphic being 0.05–1. The synthetic polymer binder consists of chloro-sulphonated polyethylene with a mean molecular mass of 20,000 and a density of 1.1–1.14 g/cm³. The solidifier is an amine-type solidifier. The organic solvent consists of aromatic or chlorinated hydrocarbons. A patent is sought for the following relative proportions of the components (in wt. %): synthetic polymer binder 6–9; carbon-containing filler 0.6–11; solidifier 4.5–7; organic solvent—the rest. The preferred temperature range for the use of the film coatings based on the electrically conducting paint material for which a patent is sought is 30–120° C.

1 Claim, No Drawings

ELECTRICALLY CONDUCTING PAINT MATERIAL

FIELD OF TECHNOLOGY

The invention relates to the field of the manufacture of electrically conductive paint materials on the basis of synthetic polymer binders, and may be used in various fields of technology for the production of electrically conductive film coatings on dielectric backings with a large area of heat-emitting surface, primarily for the production of elastic electrically conductive film coatings with a working temperature of the heat-emitting surface of up to 120° C.

PRIOR ART

There is a known electrically conductive paint (FR, 2662703) on the basis of a polymer film-forming binder, the composition of which includes a solvent for polymer binder and a fine-disperse electrically conductive filler in the form of a mixture of silver (60–75 wt. % of the components) and graphite (0.5–10 wt. % of the components).

The film of electrically conductive paint coating on the basis of the known paint, after drying out, has a cubic resistance of the order of $10^3$ to $10^6$ ohms×cm. The high specific resistance of the paint coating film is explained by the fact that, in spite of the high percentage content of silver (which in the pure form has a specific resistance of the order of $1.49 \times 10^{-6}$ ohms×cm), it is virtually impossible in this paint coating to ensure direct dense contact of the fine-disperse silver particles with each other, since these particles, in the process of the dispersion of the components in the preparation of the paint, become coated with the polymer binder.

Because of this, contact of adjacent particles of silver in the electrically conductive paint film coating produced takes place mainly through a layer of binder material.

The presence of particles of graphite in the known composition of electrically conductive paint facilitates a certain reduction in the specific resistance of the paint coating film, since the fine-disperse particles of graphite, possessing a high degree of porosity, are capable of adsorbing the binder, thus ensuring dense direct contact of the surfaces of the adjacent particles of graphite.

However, where the composition of the known electrically conductive paint includes particles of silver, the dimensions of which are greater than those of the pores of the graphite material, during the dispersion process the graphite pores will be filled with particles of metal (silver).

As a result of this, there will not be dense contact between all the graphite particles present in the paint coating film.

Taking account of the fact that the total content of graphite particles is small in proportion to the content of silver particles, the specific resistance of the paint coating film will be determined mainly by the specific resistance of the film-forming binder, which is several orders higher than that of the graphite and silver.

Calculations show that when a paint coating film of electrically conductive paint of the known composition is applied to a specimen in the form of a dielectric backing in the shape of a square of an area of one square meter, for a thickness of coating film equal to 25 μm, when voltage of 220 V is applied to the corresponding sectors of the coating film (on condition that the specific cubic resistance of the coating film is $10^3$ ohms×cm), power of about 2 W will be produced on this specimen.

Comparing this power with the power, for instance, of a standard domestic oil radiator (which is 800–1200 W) for the same area of heat-emitting surface, the conclusion can be drawn that the known electrically conductive paint is inapplicable for use in producing heat-emitting electrically conductive surfaces of heating devices and systems.

This is due to the high specific cubic resistance ($10^3$–$10^6$ ohms×cm) of the paint coating film based on electrically conductive paint of the known composition.

Furthermore, the electrically conductive paint of the known composition is very expensive, which limits its field of application.

There is a known electrically conductive polymer composition (WO, application PCT No. 92-03509) on the basis of a polymer film-forming binder, the composition of which also includes a film-forming binder solvent and a fine-disperse electrically conductive filler comprising 40–80 wt. % of the composition. The electrically conductive filler may be composed of particles of graphite or carbon with a content of 10–50 wt. % of the composition.

The known electrically conductive polymer composition as described in the application may contain an electrically conductive filler in the form of a mixture of fine-disperse metal particles and graphite particles, or solely in the form of particles containing carbon.

The shortcomings of the known electrically conductive polymer composition in which the electrically conductive filler is in the form of a mixture of metal and carbon-containing particles are described above.

In this case, the specific cubic resistance of a coating on the basis of the known composition will be determined by the specific resistance of the polymer binder, and will be of the order of $10^3$–$10^6$ ohms×cm. As stated above, this makes it impossible to use this film coating as a heat-emitting element for electrical heating devices and systems.

The known electrically conductive polymer composition made with electrically conductive filler in the form of fine-disperse carbon-containing particles alone also fails to produce the desired result.

This is due to the fact that the achievement of a significant reduction in the specific cubic resistance of a coating film on the basis of the known electrically conductive polymer composition requires not only the raising of the percentage content of the carbon-containing particles in the known composition, but also a certain percentage content of pure carbon in these particles in combination with a certain specific adsorption surface of the said carbon-containing particles. No provision is made for this in the known technical solution.

It is therefore virtually impossible to produce a film coating on the basis of the known electrically conductive polymer composition with the required electrophysical characteristics (for different voltage magnitudes in the electricity supply circuit).

Furthermore, the high content of pure carbon in the known electrically conductive polymer composition considerably reduces the mechanical strength of a film coating on the basis of the known composition. This limits the field of application of the known composition and therefore of an electrically conductive film coating based on it, due to its low durability.

There is a known electrically conductive composition (JP, 61-276868) for producing electrically conductive film coatings with stable physic-mechanical properties in conditions of subjection to high temperatures with high humidity. The known composition contains 20–70 wt. % of carbon powder, 30–80 wt. % of epoxy coating binder and 0.1–2 parts by weight of hardener (imidazole) for 100 parts by weight of binder.

A shortcoming of the known electrically conductive polymer composition is the fact that the high percentage content of carbon-containing filler in the form of carbon powder (soot) has an adverse effect on the mechanical strength of electrically conductive film coatings based on the known composition. This limits the field of its use due to the reduction in the durability of electrically conductive film coatings on the basis of the known composition.

Furthermore, in view of the use of epoxy coating resins in the known composition as the film-forming binder, film coatings based on it cannot be applied to backings of flexible, elastic and soft materials, since these coatings have low elasticity characteristics (and therefore a high modulus of elasticity) relative to such backing materials. Consequently, electrically conductive film coatings on the basis of the known polymer composition are incapable of withstanding alternating bending and/or straining loads for long. This considerably limits the field of application of the known electrically conductive polymer composition.

The electrically conductive composition (SU, 681080) which is the closest in its qualitative composition and physico-mechanical properties to the invention applied for includes saturated polyester resin, diisocyanate, solvents, and an electrically conductive filler. Furthermore, the known composition contains 2, 4-toluylene diisocyanate as the diisocyanate, graphitised kaolin as the filler with a kaolin to graphite ratio of 1:9 to 9:1, and additionally, copper salicylalimin, in the following ratio (parts by weight):

| | |
|---|---|
| Saturated polyester resin | 100 |
| 2,4-toluylene diisocyanate | 98–102 |
| Solvents | 95–105 |
| Copper salicylalimin | 0.07–0.09 |
| Graphitised kaolin | 120–190 |

A shortcoming of the known electrically conductive composition is the fact that film coating produced on the basis of it, in regard to its physico-mechanical properties, does not ensure set parameters, stable over time, in a voltage regime of 12–220 V and a temperature regime for use in excess of 100° C.

The specific resistance of an electrically conductive coating on the basis of the known composition is quite high—from 0.5 to $10^6$ ohms. Consequently, normal operation of this electrically conductive coating can only be ensured at a voltage of 220 V and a nominal temperature of use of 60–70° C.

Furthermore, the optimum content of electrically conductive filler in the known electrically conductive composition within the limits of 120–190 parts by weight of the weight of the binder leads to a loss of mechanical strength in electrically conductive coatings on the basis of the known composition. This makes it unacceptable for producing electrically conductive film coatings on backings of soft, flexible or elastic materials.

The technology for producing the known electrically conductive material is quite complex and expensive, and takes a long time. This considerably limits the field for the use of this composition for producing electrically conductive film coatings. The more so, since after the application of the known composition to a backing, film formation does not take place on the backing. Consequently, the simplest and cheapest paint application method is excluded, and the pressing of the known composition cannot ensure uniformity of structure of the coating as regards the quantitative ratio of the correct quality composition of the ingredients per unit area of coating. It is therefore not possible to ensure the necessary stability of electrical properties (in particular specific resistance) over the entire area of the surface of a coating on the basis of the known electrically conductive composition.

DISCLOSURE OF THE INVENTION

The invention applied for addresses the problem of creating an electrically conductive paint material (paint), a film coating of which on a dielectric backing would have electrical characteristics stable over the entire area, high mechanical strength, high elastic characteristics (elasticity), and low specific resistance (from $10^{-1}$ to $10^{-2}$ ohms×cm), which would enable an electrically conductive film coating on the basis of the electrically conductive paint material being patented to be used as a heat-emitting element in various fields of technology, and in particular, in electrical heating devices and systems for different voltages in the electricity supply circuit and for different conditions of use, particularly on backings of flexible, soft and elastic materials.

The problem addressed is solved by an electrically conductive paint material including a synthetic polymer binder, a carbon-containing filler, a hardener and an organic solvent. The carbon-containing filler comprises a mixture of graphite and soot in a ratio by weight of soot to graphite of 0.05–0.1. The synthetic polymer binder comprises chlorinated and sulfurised polyethylene with a mean molecular mass of 20,000 and a density of 1.1–1.14 g/cm³. The hardener is an amine type hardener. The organic solvent comprises aromatic or chlorinated hydrocarbons. The ratio of components (wt. %) is as follows:

| | |
|---|---|
| synthetic polymer binder | 6–9 |
| carbon-containing filler | 0.6–11 |
| hardener | 4.5–7 |
| organic solvent | to 100 |

The combination in the invention applied for of a certain percentage content of polymer binder and carbon-containing filler in which there is a certain ratio of pure carbon (soot) and graphite, makes it possible to ensure dense contact of all the particles of electrically conductive filler in a film coating produced from the electrically conductive paint material being patented.

This makes it possible to ensure that the specific resistance of a paint coating film on the basis of the composition applied for is within the limits $10^{-1}$–$10^{-2}$ ohms×cm, which is several orders lower than in the known technical solutions.

Furthermore, the specified ratio of pure carbon (soot) and graphite in the carbon-containing filler, in combination with the use of chlorinated and sulfurised polyethylene as the film-forming binder, enables a film coating on the basis of the composition applied for to have higher mechanical strength, and imparts the required elasticity to it.

The process for producing the electrically conductive paint material (paint) being patented, in accordance with the invention, and the electrically conductive film coating based on it, is as follows.

Chlorinated and sulfurised polyethylene, in accordance with the specified ratio, is loaded into a mixer which can heat it electrically to 830° C. Organic solvent (toluene) is poured in, and in accordance with the set technological regime, the solution is left until the chlorinated and sulfurised polyethylene has entirely dissolved. The fine-disperse electrically conductive filler is then put into the solution obtained, organic solvent is added and dispersion takes place in accordance with the set technological regime. After this, the contents of the mixer are unloaded, and a solution of hardener in accordance with the specified ratio is introduced into it immediately before application to the backing of dielectric material.

The dispersing device may be a ball or bead mill, a dissolver or a high-speed mixer. The electrically conductive paint material may be applied by a brush or roller, or by pneumatic, electrostatic and air-free spraying, or by jet flow coating. However, an aerosol technique is preferable for applying the electrically conductive paint material to the dielectric backing.

Best Variant for Implementing the Invention

The electrically conductive paint material applied for in accordance with the invention contains the following ingredients, wt.%:

| | |
|---|---|
| synthetic polymer binder | 6–9 |
| carbon-containing filler | 0.6–11 |
| hardener | 4.5–7 |
| organic solvent | to 100 |

The carbon-containing filler consists of a mixture of graphite and soot, with a ratio by weight of soot to graphite of 0.05–0.1.

The synthetic polymer binder used is chlorinated and sulfurised polyethylene, with a mean molecular mass of 20,000 and a density of 1.1–1.14 g/cm$^3$ (mass portion of chlorine, %, within limits 26–32; mass portion of sulfur, %, within limits 1.3–2.2; solubility in carbon tetrachloride, %, not less than 98.5; mass portion of water, %, not more than 0.5; loss of mass on drying out, %, not more than 1.5; mass portion of ash, %, not more than 0.5; mass portion of iron, %, not more than 0.025).

As the organic solvent, aromatic and chlorinated hydrocarbons are used.

However, it is preferable to use, specifically, coal and shale toluene (methylbenzene, $C_6H_5CH_3$, molecular weight—92.14), petroleum xylene (dimethylbenzene, $(CH_3)_2C_6H_4$, molecular weight 106.17) and mixtures of them.

The hardeners used are aliphatic amines and diamines, and quaternary amonic bases. However, it is preferable to use methylsilazane hardener mark MSN-7-80, which is obtained by the ammonolysis of methyltrichlorsilane and dimethyldichlorsilane in toluene (external appearance: a resinous, viscous, cloudy liquid, light to dark yellow in color; the presence of a white crystalline sediment is permissible. Content of non-volatile substances, %: 75–85; content of nitrogen, %: not less than 20).

The electrically conductive carbon-containing filler used consists of carbon (soot) and graphite.

It is preferable to use, for example:

carbon (soot) mark P 268-E (furnace soot, active, produced during the incomplete combustion of natural gas with oil in combustion chambers; diameter of particles, nm: from 50–70; adsorption of dibutylphthalate, cm$^3$/100 g: for granulated carbon—from 60 to 70; for ungranulated carbon—from 80 to 100; pH of aqueous suspension: of granulated carbon—from 8.5 to 10; of ungranulated carbon—from 6.5 to 8.5; density, g/cm$^3$ 1.87; oil number, 1/kg (mg/1): 0.7).

carbon (soot), technical, mark P 803 (furnace, low-active, obtained during the thermal oxidation decomposition of liquid hydrocarbon raw material, with low dispersion indicator and average structuring indicator; adsorption of dibutylphthalate, cm$^3$/100 g: for granulated carbon—from 76 to 90; for ungranulated carbon—from 86 to 100; pH of aqueous suspension:— of granulated carbon—from 7 to 9; of ungranulated carbon—from 7.5 to 9.5; ash content, %: for granulated carbon—not more than 0.45; for ungranulated carbon—not more than 0.20).

special low-ash graphite (crystalline graphite, obtained during the joint or separate concentration of natural graphite ores and graphite-containing waste from metallurgical production with subsequent chemical purification; ash content, %: not more than 0.5; portion of moisture by weight, %: not more than 0.2; output of volatile substances, including from flotation reagents, %: not more than 0.2).

extra pure powder graphite (portion by weight of particles of size up to 90 μm—not less than 90%; particles from 90 to 140 μm—not more than 10%; portion by weight of impurities, %, not more than: aluminium—$1\times10^{-5}$, boron—$1\times10^{-5}$, iron $1\times10^{-5}$, silicon—$3\times10^{\times 5}$ magnesium—$1\times10^{-5}$ manganese—$5\times10^{31\ 6}$, copper—$5\times10^{-6}$, titanium—$1\times10^{-5}$).

The carbon may be produced by the thermal oxidation destruction of liquid hydrocarbon raw material, such as benzene, toluene or naphthalene, at a temperature of not less than 1,000° C.

It is permissible to replace the liquid raw material with gaseous hydrocarbons such as ethylene, propylene, propane, methane or carbon monoxide (CO).

It is desirable that the content of pure carbon in the electrically conductive carbon-containing filler should be not less than 97% (by weight), and the specific adsorption surface should be more than 230 m$^2$/g.

The graphite particles should preferably have a branched structure; their size should preferably be 0.3–30 nm. This raises the elasticity of the film coating on the basis of the electrically conductive paint material (paint) being patented.

For a better understanding of the invention applied for, the following examples of the specific quantitative ratio of ingredients in the electrically conductive paint material for producing a film coating on its basis are given.

EXAMPLE 1.

The ingredients used in Example 1 were:

as the synthetic polymer binder—chlorinated and sulfurised polyethylene, with mean molecular mass 20,000 and density 1.1–1.14 g/cm$^2$;

as the carbon-containing filler—carbon (soot) mark P 268-E and extra pure powder graphite;

as the hardener—methylsilazane hardener mark MSN-7-80;

as the organic solvent—toluene.

EXAMPLE 2.

The ingredients used in Example 2 were:

as the synthetic polymer binder—chlorinated and sulfurised polyethylene with mean molecular mass 20,000 and density 1.1–1.4 g/cm$^3$;

as the carbon-containing filler—carbon (soot), technical, mark P 803, and special low-ash graphite;

as the hardener—methylsilazane hardener mark MSN-7-80;

as the organic solvent—toluene.

EXAMPLE 3.

The ingredients used in Example 3 were:
as the synthetic polymer binder—chlorinated and sulfurised polyethylene with mean molecular mass 20,000 and density 1.1–1.14 g/cm$^3$;
as the carbon-containing filler—carbon (soot) mark P 268-E and extra pure powder graphite;
as the hardener: methylsilazane hardener mark MSN-7-80;
as the organic solvent—toluene.

The quantitative and qualitative composition of the ingredients of the electrically conductive materials in accordance with Examples 1, 2 and 3 is shown in the following table.

TABLE

| Ingredients | Compositions for the examples, wt. % | | |
|---|---|---|---|
| | 1 | 2 | 3 |
| Chlorinated and sulfurised polyethylene | 6 | 7 | 9 |
| Carbon (soot) P 268-E | 0.5 | — | 0.5 |
| Carbon (soot), technical, P 803 | — | 0.5 | — |
| Extra pure powder graphite | 6 | — | 6 |
| Special low-ash graphite | — | 6 | — |
| Methylsilazane hardener MSN-7-80 | 4.6 | 5.6 | 7 |
| Organic solvent (toluene) | to 100 | to 100 | to 100 |

Example 1 (column 1 of table) is the composition for producing electrically conductive film coating used where the voltage supplied is 12 V.

Example 2 (column 2 of table) is the composition for producing electrically conductive film coating used where the voltage supplied is 110 V.

Example 3 (column 3 of table) is the composition for producing electrically conductive film coating used where the voltage supplied is 220 V.

It has been checked experimentally that in each of the above examples, the corresponding qualitative and quantitative composition of the electrically conductive paint material for the given supply voltage rating provides for a heating temperature of the film coating (formed by the stated composition of ingredients) within limits from 30° C. to 120° C.

Thus, the main advantages of the electrically conductive paint material which has been filed are the following properties possessed by an electrically conductive film coating produced on the basis of it and applied to a dielectric backing:

- low specific resistance (from 10$^{-1}$ to 10$^{-2}$ ohms×cm), enabling both safe (12–36 V) and industrial (127–220 V) voltages to be used where the paint film coating is used as the heat-emitting element of electrical heating devices and systems;
- high adhesion capability, enabling a wide range of backings to be used, including linoleum, carpets, wallpaper, various fabrics, rubber and similar flexible, soft and elastic materials;
- the possibility of creating heating surfaces of large area with stable electrical characteristics over the entire area of the coating and with high heat yield;
- economy;
- the possibility of producing electrical heat-emitting film coatings with set output temperature parameter in the temperature interval 30–120° C.;
- the possibility of producing electrical heat-emitting film coatings in the course of manufacture with a set output parameter for thermal load (from 30 W/m$^2$ to 600 W/m$^2$).
- optimum heat yield conditions for the electrical heat-emitting film coatings produced.

Industrial Applicability

Electrically conductive paint material in accordance with the invention may be used to produce electrical heat-emitting film coatings, applicable primarily in the production of sources of thermal energy with temperature of the heat-emitting surfaces from 30° C. to 120° C., working in the voltage range from 12 V to 220 V. For example, for:

- equipment for hothouses;
- dryers for agricultural produce and for domestic purposes;
- medical electrotherms;
- heated seats for road vehicles;
- dry airfield runways, etc.

We claim:

1. An electrically conductive paint material including synthetic polymer binder, hardener and organic solvent, characterised in that, as the carbon-containing filler, it contains a mixture of graphite with soot in a weight ratio of soot to graphite of 0.05–0.1; as the synthetic polymer binder, it contains chlorinated and sulfurised polyethylene with a mean molecular mass of 20,000 and density 1.1–1.4 g/cm$^3$, as the hardener, hardener, and as the organic solvent, aromatic or chlorinated hydrocarbons, in the following ratio of components, wt. %:

| | |
|---|---|
| synthetic polymer binder | 6–9 |
| carbon-containing filler | 0.6–11 |
| hardener | 4.5–7 |
| organic solvent | to 100. |

* * * * *